Figure 6:
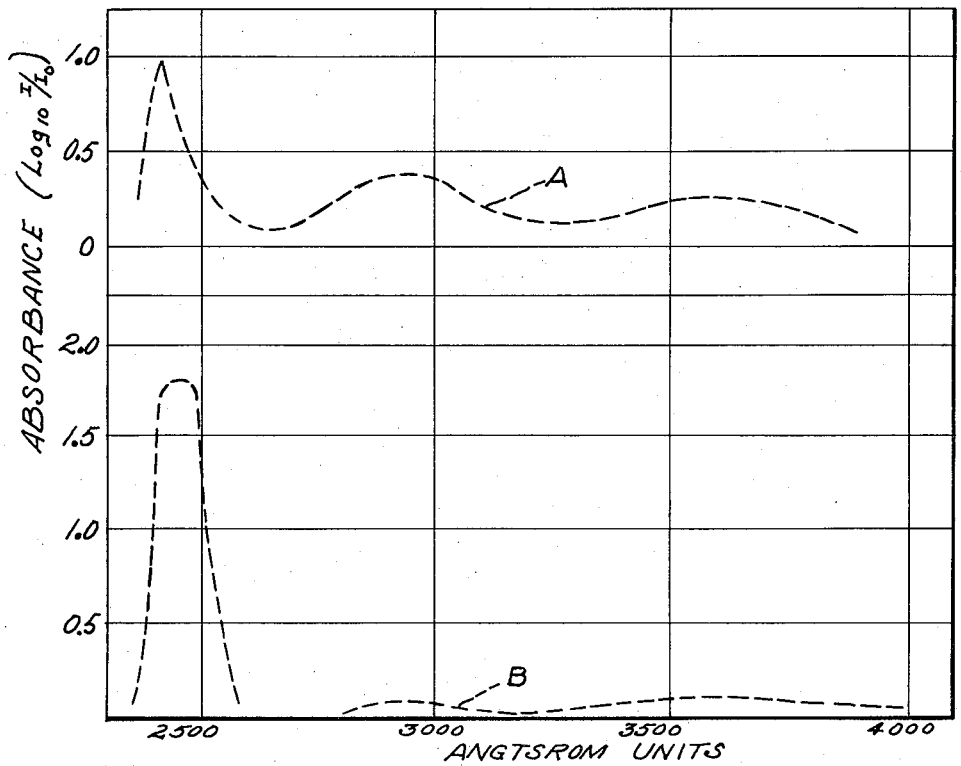

July 10, 1962            B. MANNING            3,043,667

PRODUCTION OF ULTRA-PURE SILICON OR GERMANIUM

Filed Oct. 31, 1960            3 Sheets-Sheet 1

INVENTOR.
BERNARD MANNING

July 10, 1962  B. MANNING  3,043,667
PRODUCTION OF ULTRA-PURE SILICON OR GERMANIUM
Filed Oct. 31, 1960  3 Sheets-Sheet 2

INVENTOR.
BERNARD MANNING
BY
ATTORNEYS

July 10, 1962 B. MANNING 3,043,667
PRODUCTION OF ULTRA-PURE SILICON OR GERMANIUM
Filed Oct. 31, 1960 3 Sheets-Sheet 3

INVENTOR.
BERNARD MANNING

United States Patent Office 3,043,667
Patented July 10, 1962

3,043,667
PRODUCTION OF ULTRA-PURE SILICON
OR GERMANIUM
Bernard Manning, Waltham, Mass., assignor to the United States of America as represented by the Secretary of the Air Force
Filed Oct. 31, 1960, Ser. No. 66,369
2 Claims. (Cl. 23—223.5)

This invention relates to a process for the preparation of semiconductor materials and more particularly to a process for effecting the production of ultra-pure elemental metals having semiconductor characteristics. An elemental metal having semiconductor characteristics is understood to be a metal having the necessary electron-hole structure which enables it to be used in transistor applications such as silicon and germanium. Specifically, this invention is concerned with a method of removing impurities from the tetrahalides of silicon and germanium followed by reduction of the respective tetrahalide to obtain an ultra-pure elemental metal.

Semiconductor metals to be suitable for transistor applications must be extremely pure since even minute quantities of impurities affect its electrical characteristics. For example, transistor grade elemental metals now available are reported to be about 99.98 percent pure. Such purity is difficult to obtain and has made metals suitable for transistor applications relatively expensive.

Silica, having a minimum amount of certain impurities, is the usual starting material in the production of ultra-pure, transistor grade silicon. In general, the pure silicon obtained heretofore has been prepared by reducing the selected silica to silicon, leaching the silicon with acid, washing, converting to silicon tetrachloride, which is then fractionally distilled and reconverted to silicon metal by the vapor phase reaction of silicon tetrachloride and zinc. The purified silicon thereby produced is further purified by melting, crystal pulling, and single crystal growth techniques. Recently a combination of floating zone purification and reaction with water vapor have been used to further purify the silicon. Necessarily, techniques which involve melting of silicon metal must be carried out at temperatures above about 1430° C. These temperatures are sufficiently high to volatilize minute portions of the oven components and to leach containers. Thus the purity of the final product is adversely effected due to the resultant introduction of undesired impurities. Further, such techniques are expensive and are difficult to carry out and control.

It is the principal object of this invention to circumvent the above described limitations of the prior art by providing a novel method for the production of ultra-pure, transistor grade metals.

A further object of this invention is to provide a method of producing ultra-pure transistor metals which does not require melting the metal at high temperatures.

A still further object of this invention is to provide a purification method which is relatively simple to carry out and control.

A still further object of this invention is to provide a method of producing ultra-pure silicon and germanium suitable for use in transistor applications.

Another object of this invention is to provide a method of purifying the tetrahalides of silicon and germanium.

Still another object of this invention is to provide an economical method of producing ultra-pure silicon and germanium which lends itself to the use of simple chemical apparatus.

In accordance with this invention, it has been found that improved silicon and germanium purification is achieved by a method which comprises the steps of vacuum subliming the respective tetrahalide, selectively adsorbing impurities from the tetrahalide by passing a solution thereof through purified silica gel, recovering the tetrahalide from the solution, zone purifying the tetrahalide by passing a mass thereof slowly past alternate melting and cooling zones, and reducing the tetrahalide to elemental silicon or germanium by passing hydrogen gas into a retort containing the halide heated to an elevated temperature, said gas and halide vapor passing into a column having freely suspended therein a silicon or germanium crystalline body. The lower portion of the body is heated electronically by induction to the reduction temperature of said halide with the result that the reduced, ultra-pure metal is deposited on said heated portion.

In a preferred embodiment, the halide is silicon or germanium tetraiodide, the sublimation is conducted under a vacuum at between 90° C. to 110° C., but preferably 100° C. The silicon body is heated to a temperature of between 600° C. to 850° C. The combination of these steps has been found to be especially advantageous in producing silicon or germanium of the highest purity.

This invention may be better understood by reference to the accompanying drawings wherein like reference numerals designate like elements throughout the several views.

Figure 1:
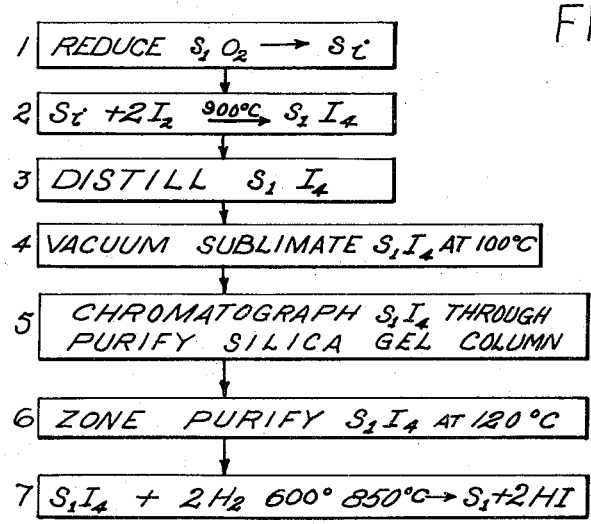
Figure 2:
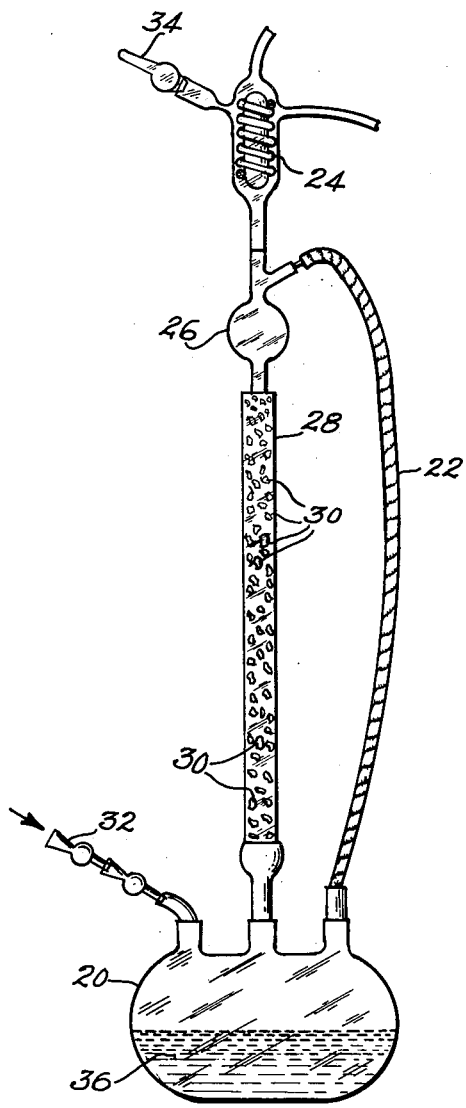
Figure 5:
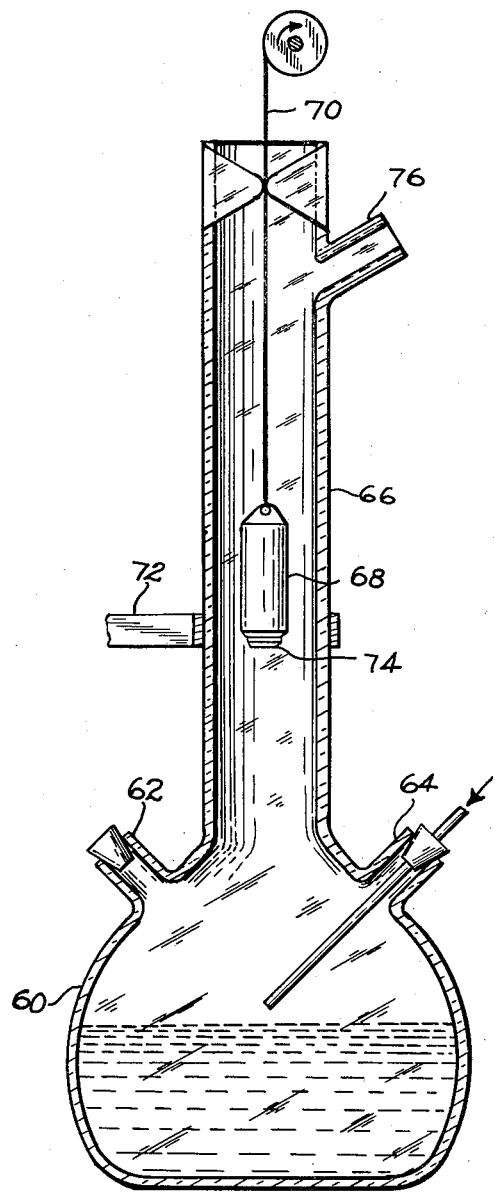
Figure 3:
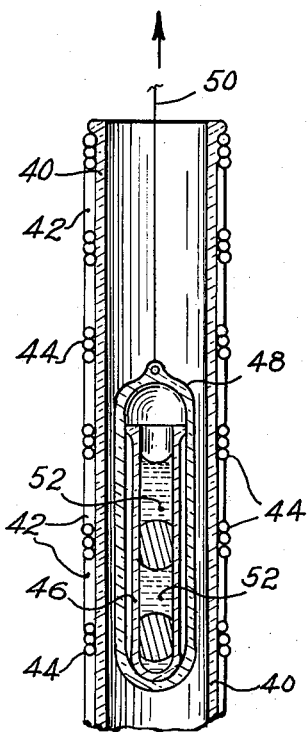
Figure 4:
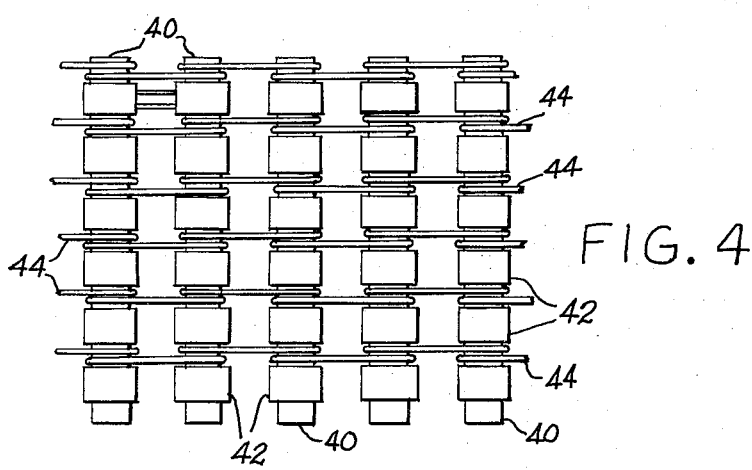

FIGURE 1 is a flow chart;
FIGURE 2 is a front view of chromatographic adsorption apparatus;
FIGURE 3 is a vertical cross-section of zone-purification apparatus;
FIGURE 4 is a front view of alternative zone-purification apparatus;
FIGURE 5 is a vertical cross-section of reduction apparatus; and
FIGURE 6 is the absorption spectra chart of a chloroform silicon tetraiodide solution before and after chromatography.

Referring to the drawings, FIGURE 1 illustrates the steps of the preferred embodiment of the present invention. Steps 1, 2 and 3 are well known in the art and are included herein only to illustrate the preparation of the silicon tetraiodide. The iodide thus produced is quite impure, containing other metallic iodides, silica, and is discolored with iodine which remains with the product despite distillation. It is to be understood that although the discussion of this invention, presented in detail hereinafter, is limited to the purification of silicon, the process so disclosed is equally applicable to the purification of germanium.

The major portion of the impurities, referred to heretofore, are removed by vacuum sublimation, step 4 of FIGURE 1. This step can be carried out in any suitable apparatus and has been successfully performed in a vacuum desiccator and in simple test tube type sublimers. The maximum yield with the minimum impurity, occurs when sublimation is conducted at 100° C. at a pressure not exceeding 0.4 mm. mercury. The silicon tetraiodide should be finely crushed and evenly spread in a thin layer so that the more volatile impurities such as iodine are initially removed. Large particles and sample masses permit these impurities to sublime continuously with the silicon tetraiodide which are then partially reabsorbed in the silicon sublimate. For the same reason high vacuum pumping rates are more effective than slower rates. The surface on which the sublimate condenses should be heated to about 60° C. to yield a purer product in larger crystals.

By this sublimation technique, crude silicon tetraiodide containing so much iodine that a portion of the material was liquid has been rendered colorless. A solid residue, principally silica, is left after sublimation which is either white or colored depending on the purity of the starting material. Distilled silicon tetraiodide gives a fluffy, white silica residue. The condensing surface of the sublimer may also be advantageously seeded by leaving a few crystals from the previous sublimation. If the condensing surface is clear and contains only a few seed crystals, crystals as large as 0.7 cm. on a side will form. As will be hereinafter shown, vacuum sublimation is an important step in this purification process.

The next purification step, step 5 of FIGURE 1, comprises chromatography or selective adsorption of further impurities from the sublimed silicon tetraiodide. Apparatus suitable for this process is illustrated in FIGURE 2. This apparatus comprises a boiling pot 20 having three openings, a vapor delivery tube 22 insulated with an asbestos wrapping, a condenser 24, a reservoir 26 filled with silicon tetraiodide, a column 28 filled with purified silica gel 30, and a gas purging system comprising an inlet 32 and an outlet 34.

The commercial silica gel is first purified by extraction with hot hydrochloric acid for approximately 100 hours and is then filtered and washed to neutrality with distilled water. The gel is then vacuum dried and heated overnight at 450° to evaporate all trace of water which would hydrolize the silicon tetraiodide. While still hot the gel is packed in the column with the aid of high speed vibration while dry helium is passed through the column.

The impure silicon tetraiodide is then introduced into the reservoir 26, the condenser 24 connected and started, chloroform 36 introduced into the boiling pot and air again purged from the system with a dry, inert gas such as helium, carbon dioxide, or nitrogen. The chloroform is then heated to boiling, the vapors passing up the tube 22, condensing and dripping down on the sample in the reservoir. The solvent dissolves the sample and passes through the gel column whose solutes are adsorbed. The column is preferably heated to maintain the solvent at a slightly elevated temperature to prevent precipitation due to cooling of a saturated system. As reboiling of the solvent is continued the adsorbed silicon tetraiodide is redissolved and carried to the boiling pot 20. Impurities collecting in the column form distinct color bands in the upper portions of the column. The normal elution time is fourteen hours at a rate of 10 cc. per hour on a sample of 20 grams.

In addition to the aforementioned color bands which appear in the gel column, FIGURE 6 illustrates the removal of impurities. Curve A is the absorbence (log $10 I/I_0$ where I is the intensity of light after passing through the unknown solution while $I_0$ is the intensity of light after passing through only the solvent) at various wave lengths of a chloroform solution before chromatography and curve B is the absorbence after 19 hours elution. The changes in intensity at 2415 A., 2930 A. and 3560 A. indicate changes in the components of the solute. Further analytical data is hereinafter given.

With further regard to the step of purifying the tetraiodide by selective adsorption, it has been discovered as an additional embodiment of the invention that even greater purification can be achieved by utilizing a relatively pure silica gel which has been obtained from purified silicon tetraiodide. Specifically, a portion of the purified silicon tetraiodide, that is the silicon tetraiodide which has been previously subjected to chromatographic adsorption, is converted by hydrolysis to a silica gel which gel is much purer than that initially employed. The purified gel is then utilized as the adsorbent for the remaining portion of the purified iodide. This process is repeated, each time producing a still pure silica gel and a still purer iodide until there is ultimately produced an extremely pure tetraiodide. Conversion of the silicon tetraiodide to silica gal is achieved by dissolving a sample of the solid tetraiodide in a solvent such as alcohol or carbon tetrachloride, adding water and heating in order to hydrolyze, filtering off the silicious acid and subsequently heating to a temperature of 400° C. in a quartz container to dehydrate the sample thus producing a purified silica gel.

Referring again to FIGURE 1, step 6 in the process comprises a zone-purification of the previously purified silicon tetraiodide at the melting point of 120° C. Apparatus suitable for this purpose is illustrated in FIGURE 3 and comprises a tube 40 around which are coiled an alternate series of heaters 42 and coolers 44. The sample of partially purified iodide is placed in a quartz tube 46 and sealed in a Pyrex container 48 containing an inert atmosphere. The container 48 is suspended by a thread 50, preferably quartz, and is thereby slowly drawn up through the tube 40. As the solid iodide sample passes the heating elements 42, a band of sample is melted and then resolidified as it reaches and passes the cooling elements 44. As the sample is slowly drawn up through the tube 40, liquid layers 52 slowly proceed to the bottom of the tube 46 carrying and concentrating the impurities at the bottom. Obviously any number of heating and cooling zones may be employed, but a series of six alternate heating and cooling elements 42 and 44 are preferred. The heating zones are advantageously about ½ inch in width while the cooling zones may be as narrow as possible provided that resolidification of the sample is assured. The slower the rate of travel of the sample through the tube the better the purification. Rates varying from 1.0 centimeter to 2.5 centimeters per hour have been found satisfactory with the lower rate being preferred.

The zone-purification apparatus shown in FIGURE 3 can be set up in multiple banks as shown in FIGURE 4 to greatly increase the capacity and efficiency of this phase of the invention. The apparatus shown in FIGURE 4 comprises a plurality of tubes 40 having alternate heating elements 42 and cooling elements 44. The heating elements 42 can comprise copper plates or Calrods while the cooling elements 44 can be water coils or jackets. Equivalent heating and cooling means could be employed and a greater or lesser number of tubes 40 used. The iodide samples are drawn simultaneously through the tubes 40.

After the iodide has been purified by zone melting, the Pyrex container 48 of FIGURE 3 is broken and the iodide melted. The top, purified portion (approximately 60 percent of the sample) is carefully poured off leaving the bottom portion with the concentrated impurities. The direction of movement of the iodide sample is such that the impurities are concentrated in the bottom of the quartz tube to avoid having to pour the purified material over the concentrated impurities. While a single sealed quartz tube could be used and broken to remove the sample, it is more convenient to use the outer Pyrex container which permits reuse of the more expensive inner tube 46.

The final step in the process, step 7 of FIGURE 1, comprises vapor reduction of the iodide with hydrogen. Apparatus particularly suited for this purpose is illustrated in FIGURE 5. This apparatus comprising a retort 60 having delivery tubes 62 and 64 and a vertical column 66. A silicon body 68 is suspended in the column 66 by means of a quartz thread 70. The lower portion of the silicon body 68 is heated by means of a high frequency induction heater 72.

The purified silicon tetraiodide is melted and introduced into the pot 60 through the delivery tube 62 which is thereafter closed. The heater 72 is energized to heat the lower portion of the silicon body 68 to reduction temperature. Hydrogen is then passed into the system through the delivery tube 64 to purge the system. The silicon tetraiodide is heated to boiling (approximately 280° C.). Hydrogen gas is introduced into the system, preferably just over the surface of the iodide, in amounts in excess of stoichiometric requirements.

As the mixture of iodide vapors and hydrogen gas ascend in the column 66 they contact the hot lower surface of the silicon body 68 where reduction takes place and where purified silicon 74 deposits. The excess vapors, hydrogen and reaction products, pass up the column 66 and out an exit tube 76. These products can be separated, with or without oxidation, and reused.

As the silicon deposit accumulates the silicon body 68 is slowly drawn upwardly by means of the quartz thread 70 to maintain the new deposition surface within the induction heating zone provided by the high frequency heater 72. The top of the column 66 is closed except for a small opening through which the quartz thread 70 passes and can be covered, if desired, with a cap of rubber or the like. For the reduction of purified silicon tetraiodide the lower portion of the body 68 is heated to a temperature between about 600° C. and 850° C. with the higher temperatures preferred. While it is preferred from a standpoint of efficiency to heat the iodide to boiling and to pass hydrogen just over the boiling surface, lower temperatures can be used and the hydrogen bubbled through the liquid.

The amount of silicon tetraiodide which is carried over by the hydrogen per unit of time at a given temperature, hereinafter referred to as through-put rate, depends to a great extent on the temperature of the tetraiodide. Heating the tetraiodide to the boiling point gives a preferred through-put rate, but temperatures in excess of boiling adversely affect the efficiency of the decomposition of the tetraiodide. Temperatures lower than boiling, although efficient with respect to decomposition, are relatively uneconomical.

In a specific example of such apparatus, the column 66 was 27 inches long with the base of the silicon body 68 suspended about nine inches from the bottom of the column. The heater 72 had 7 turns in a coil 1½ inches high. The silicon tetraiodide was heated to 280° C. and the hydrogen was passed into the system at a rate of about 50 cc. per minute. As a result, the silicon deposited at a rate of about 0.4 gram per hour.

It is an important feature of this reduction method that only the lower deposition portion of the silicon body 68 is heated. Reduction and deposition take place at only this point with no contact or contamination between the heater and deposition surface. The speed of upward movement of the deposition surface, the rate of deposition, and the shape of the induction heating field can all be adjusted to give uniform growth of the deposited silicon. Deposition at a rate of about 0.1 gram per hour silicon yields large crystals and can be adjusted to yield single crystals of pure silicon at a temperature well below the melting point of silicon. By introducing impurities in the silicon tetraiodide, or better, in the hydrogen stream, controlled impurities can be introduced into the growing silicon crystal to alter the electrical characteristics to provide transistors of various desired characteristics. This technique thus provides a convenient and controllable method of growing transistors from the vapor phase.

The silicon body 68 is preferably very pure silicon. However, impure silicon can be utilized as a starting material until sufficient pure silicon is formed for the purpose. Where very pure silicon is used, it is sometimes necessary to initially heat the body before introducing it into the induction zone.

The following table of analytical data illustrates the purification obtained by the various steps and combination of steps according to this invention. Each step indicated was performed according to the specific procedure hereinbefore set forth for that step. Where applicable, the silicon tetraiodide, purified as indicated, was hydrolyzed to silicon dioxide using a minimum of distilled water. The resulting hydriodic acid was removed and soluble silicic acid partially precipitated by boiling. The residue was filtered, dried, and submitted to infrared spectrographic analysis.

TABLE I

[Concentration of Impurities (p.p.m.)]

| Sample No. | 1 | 2 | 3 | 4 | 5 | 6 | 7 | 8 | 9 | 10 | 11 |
|---|---|---|---|---|---|---|---|---|---|---|---|
| Element: | | | | | | | | | | | |
| Ag | [1]ND | 23 | ND | ND | ND | 2.5 | 3.0 | ND | 4.5 | ND | ND |
| Al | 7,200 | 230 | 45 | 15 | 1 | 20.0 | 13.5 | 1 | 1.0 | 750 | 1 |
| As | ND | ND | ND | ND | ND | ND | ND | ND | ND | ND | ND |
| B | 13 | ND | ND | ND | 1.5 | ND | ND | 25 | 500 | ----- | 375 |
| Be | ND | ND | ND | ND | ND | ND | ND | ND | ND | ND | ND |
| Bi | ND | ND | ND | ND | ND | ND | ND | ND | ND | ND | ND |
| Ca | 7,400 | ----- | 5 | ----- | 26 | ----- | ----- | 35 | ----- | ----- | 30 |
| Cb | ND | ND | ND | ND | ND | ND | ND | ND | ND | ND | ND |
| Cd | ND | ND | ND | ND | ND | ND | ND | ND | ND | ND | ND |
| Co | ND | ND | ND | ND | ND | ND | ND | ND | ND | ND | ND |
| Cr | 600 | 7.5 | ND | ND | ND | ND | 23.0 | ND | 45 | ND | ND |
| Cu | 50 | 7.5 | 5 | 1 | 1 | 1.4 | 1.4 | 1 | 50 | 1 | 4 |
| Fe | 6,900 | 75 | 6 | (10) | 2 | 7.5 | 8.5 | 2 | 270 | 5 | 3 |
| Ga | ND | ND | ND | ND | ND | ND | ND | ND | ND | ND | ND |
| Ge | ND | ND | ND | ND | ND | ND | ND | ND | ND | ND | ND |
| Hg | ND | ND | ND | ND | ND | ND | ND | ND | ND | ND | ND |
| In | ND | ND | ND | ND | ND | ND | ND | ND | ND | ND | ND |
| K | 4 | ND | ----- | ND | ----- | ND | 10 | ----- | 27.5 | ND | ----- |
| Li | 2.5 | 1.5 | ----- | ND | ----- | ND | 1 | ----- | 2.5 | ND | ----- |
| Mg | 750 | 13.5 | 9 | 25 | ----- | 2.5 | 10 | 15 | 175 | 13.5 | 8 |
| Mn | 500 | 0.1 | 13.5 | 1 | 1 | 1 | 2.6 | ND | 65 | 1 | 2.5 |
| Mo | ND | ND | ND | ND | ND | ND | ND | ND | ND | ND | ND |
| Na | 13.5 | 35 | ND | ND | ND | ND | ND | ND | 0.19 | 1 | ND |
| Ni | 40 | ND | ND | ND | ND | ND | ND | ND | 32 | ND | ND |
| P | ND | ND | ND | ND | ND | ND | ND | ND | ND | ND | ND |
| Pb | 10 | ND | ND | ND | ND | ND | ND | ND | 10 | ND | ND |
| Sb | ND | ND | ND | ND | ND | ND | ND | ND | ND | ND | ND |
| Sn | ND | ND | ND | ND | ND | ND | ND | ND | ND | ND | ND |
| Ta | ND | ND | ND | ND | ND | ND | ND | ND | ND | ND | ND |
| Ti | 1,000 | 270 | 260 | ND | ND | ND | ND | ND | 325 | 120 | 110 |
| Tl | ND | ND | ----- | ND | ND | ND | ND | ND | ND | ND | ND |
| V | 90 | ND | ND | ND | ND | ND | ND | ND | ND | ND | ND |
| W | ND | ND | ND | ND | ND | ND | ND | ND | ND | ND | ND |
| Zr | 50 | 13.5 | 80 | ND | ND | ND | ND | ND | 135 | 13.4 | 240 |
| Zn | ND | ND | ND | ND | ND | ND | ND | ND | 125 | ND | ND |

[1] ND means that metal was not detected by the analysis employed.

The samples referred to in Table I comprised the following:

No. 1: Crude silicon metal as the starting material
No. 2: Crude SiI₄
No. 3: Distilled crude SiI₄
No. 4: Distilled and sublimed crude SiI₄
No. 5: A second sample treated as in No. 4
No. 6: Crude SiI₄ after chromatographic purification
No. 7: A second sample treated as in No. 6

No. 8: Crude SiI₄ after distillation, sublimation, and chromatographic purification
No. 9: Residue in sublimation tube
No. 10: Silica gel in column before chromatography
No. 11: Silica gel taken from top of column after chromatography This data shows that the process of this invention produces an effective purification of crude silicon tetraiodide starting material. Conversion to SiI₄ (Sample No. 2), effects a marked improvement and sublimation (Sample Nos. 5 and 6) of the SiI₄ yields a further marked improvement. Chromatographic purification of crude SiI₄ (Sample Nos. 6 and 7) is at least as effective as vacuum sublimation. However, the combination of the two steps (Sample No. 8) results in further improvement. However, this analysis is accurate only in approximately parts per million and the silica gel used was not entirely pure. From neutron activation data it is believed that chromatography after sublimation results in purification beyond the range detectable by spectroscopy.

Table II illustrates the purification obtainable by zone purification of SiI₄. An ampule of the tetraiodide, previously purified by recrystallization, was passed through two zones in a single channel oven. The ampule was then sectioned transversely into ¾ inch segments which were then separately analyzed. In this table, Sample 1 is the top and Sample 5 is the bottom of the ampule with the remaining samples in order. This data shows that impurities are concentrated in the bottom, or trailing portion of the ampule as it is drawn through the zone oven.

TABLE II

*Spectroscopic Analysis*

[Impurity concentration (p.p.m.)]

| Segment | 1 | 2 | 3 | 4 | 5 |
|---|---|---|---|---|---|
| Element: | | | | | |
| Ag | 4.0 | 1.2 | 1.2 | 2.0 | ¹ N.D. |
| Mg | 10 | 5 | 6 | 4 | 2 |
| B | 130 | 35 | 25 | 70 | 15 |
| Al | 125 | 35 | 27 | 65 | 12 |
| Cr | <20 | <20 | <20 | <20 | <20 |
| Cu | 10 | 3 | 4 | 4 | <1 |
| Fe | 30 | 10 | 10 | 12 | 5 |
| Mn | 5 | 2 | 2 | 2 | N.D. |
| Ni | N.D. | N.D. | N.D. | N.D. | N.D. |
| Ti | | 25 | 25 | 20 | N.D. |
| V | | | | | N.D. |
| A-S | | | | | <25 |
| Hg | | | | | <25 |
| In | | | | | N.D. |
| Ta | | | | | <25 |
| V | | | | | <80 |
| Zn | | | | | <25 |

¹ N.D. means not detected.

From the foregoing disclosure it is apparent that the method of this invention provides an unexpected improvement in the purification of transistor grade metals not achieved heretofore. The sum result of the steps of this method yields transistor grade silicon by a process much more easily performed and controlled, and at less cost when compared with previous methods. The vapor reduction of silicon tetrahalide with hydrogen is a substantial improvement which can be utilized with any purified halide.

It should be understood that this disclosure is for the purpose of illustration only and that the invention includes all equivalents and modifications falling within the scope of the appended claims. While silicon tetraiodide is the preferred halide, because of its convenient properties, other halides could be used where suitable ambient conditions can be established. Silicon tetrafluoride, being a gas at normal conditions and requiring considerable energy to break the Si—F bond, would be the least desirable choice.

I claim:
1. A method for the production of an ultra-pure silicon metal comprising the steps of subliming silicon tetraiodide at a temperature between about 90° C. to 110° C. within an evacuated atmosphere having a pressure not exceeding 0.4 mm. mercury, dissolving said sublimed tetraiodide in a solvent to form a solution thereof, passing said solution through a purified silica gel adsorbent in order to remove impurities therefrom, recovering said tetraiodide from the solution, passing a mass of said recovered tetraiodide past a series of alternate melting and cooling zones at the rate of from about 1.0 centimeter to 2.5 centimeters per hour, reducing said tetraiodide to silicon metal by passing a mixture of hydrogen gas and tetraiodide vapors past a suspended silicon body the lower portion of which is heated by induction to a temperature between about 600° C. and 850° C., and depositing the reduced ultra-pure silicon on the heated portion of said body.

2. A method for the production of an ultra-pure elemental metal selected from the group consisting of silicon and germanium comprising the steps of subliming a tetraiodide of said metal at a temperature between about 90° C. to 110° C. within an evacuated atmosphere having a pressure not exceeding 0.4 mm. mercury, dissolving said sublimed tetraiodide in a solvent to form a solution thereof, passing said tetraiodide solution through a purified silica gel adsorbent in order to remove impurities from said tetraiodide solution, recovering said tetraiodide from the solution, passing a mass of said recovered tetraiodide past a series of alternate melting and cooling zones at the rate of from about 1.0 centimeter to 2.5 centimeters per hour, reducing said tetraiodide to an elemental metal by passing a mixture of hydrogen gas and tetraiodide vapors past a suspended metallic body the lower portion of which is heated by induction to a temperature between about 600° C. and 850° C., said metallic body being comprised of the same metal as the metallic constituent of said tetraiodide, and depositing the reduced elemental metal on the heated portion of said body.

References Cited in the file of this patent

UNITED STATES PATENTS

| | | |
|---|---|---|
| 2,739,045 | Pfann | Mar. 20, 1956 |
| 2,904,404 | Ellis | Sept. 15, 1959 |
| 2,926,075 | Pfann | Feb. 23, 1960 |
| 2,938,772 | Enk et al. | May 31, 1960 |

OTHER REFERENCES

"Nature," Aug. 31, 1957 (vol. 180), pages 403 and 404.

"Journal of Chem. Education," vol. 33, No. 10, October 1956, pages 485–486.

"Chem. Eng.," August 1957, pages 164 and 166.

"Journal of the Electrochemical Society," June 1954, pages 290 and 291.